(12) United States Patent
Chen

(10) Patent No.: US 8,368,508 B2
(45) Date of Patent: Feb. 5, 2013

(54) METHOD OF KEYING AN IDENTIFICATION CODE INTO A CONTROLLING MEMBER AND INTO A FUNCTION CONTROLLER

(76) Inventor: Jack Chen, Oak Brook, IL (US)

( * ) Notice: Subject to any disclaimer, the term of this patent is extended or adjusted under 35 U.S.C. 154(b) by 1685 days.

(21) Appl. No.: 11/493,116

(22) Filed: Jul. 26, 2006

(65) Prior Publication Data
US 2008/0122576 A1    May 29, 2008

(51) Int. Cl.
*G05B 19/02* (2006.01)
(52) U.S. Cl. .................... 340/5.6; 340/5.65; 340/5.66
(58) Field of Classification Search .............. 340/5.1, 340/5.2, 5.6, 5.21, 5.22, 5.23, 5.24, 5.25, 340/5.65, 5.66; 701/32, 36, 47, 48, 49
See application file for complete search history.

(56) References Cited

U.S. PATENT DOCUMENTS

| 5,091,856 A * | 2/1992 | Hasegawa et al. ............ 701/36 |
| 6,662,020 B1 * | 12/2003 | Aaro et al. ................ 455/552.1 |
| 6,888,445 B2 * | 5/2005 | Gotfried et al. ........... 340/425.5 |

* cited by examiner

*Primary Examiner* — Brian Zimmerman
*Assistant Examiner* — Yong Hang Jiang
(74) *Attorney, Agent, or Firm* — Robert L. Marsh

(57) ABSTRACT

To key an identification code of a controlling member to a code reader of a function controller for controlling a function, each controlling member is fitted with a card reader and is configured to adopt the code on the card as the identification code to be attached as the identification portion of any message imparted into a signal line. In similar fashion, each of the function controllers includes a card reader for reading a card bearing a code and the function controller is configured to adopt the code read from the card as being the identification code sought by the function controller as identifying a message as originating from its associated controlling member.

6 Claims, 4 Drawing Sheets

METHOD OF KEYING AN IDENTIFICATION CODE INTO A CONTROLLING MEMBER AND INTO A FUNCTION CONTROLLER

The present application relates to the controlling of functions, such as the functions of a vehicle, from a remote location such as the driver's seat wherein a controlling member, such as a light switch, sends through a signal line a message that includes an identification portion identifying the source of the message and an instruction portion and a function controller deciphers only a message that is identifiable as originating from its associated controlling member and carries out the instruction portion of the message.

BACKGROUND OF THE INVENTION

An automobile has numerous electrically operated functions including motors, lights, sensors, and so forth, all of which must be wired into the electrical system of the vehicle. Many of the functions are controlled from a remote location such as the driver's seat. For example, the vehicle lights and electrically operated windows are all controlled from the driver's seat. In currently existing automobiles, each switch, or other device (controlling member) for controlling the operation of a function must be hard wired directly to the function, such as the lights or the motor or the electric windows, and so forth. In my recently filed co-pending application, I disclosed a circuit for controlling the functions of a vehicle from a remote location without requiring that each controlling member be hard wired directly to the function in order to maintain direct control between the controlling member and the function.

As disclosed in my co-pending application, for each function that is to be operated from a remote location, the controlling member (light switch or other control device) is electrically wired to a single line (signal line) extending to all such controlling members and extending to all functions that are to be controlled, such that the signal line connects all the controlling members and all the functions that are to be controlled from a remote location of the vehicle. Each controlling member includes a signal generator for generating a message that includes an identification portion and an instruction portion. The identification portion of the message identifies the source of the message and the instruction portion includes instructions directed to the associated function such as "turn on the lights," or "turn lights off." The message from the signal generator is imposed on the signal line connecting all controlling members and all functions. It should be appreciated that messages may be transmitted through a signal line as stated, or through a power line, or may be by wireless transmission.

Each of the functions has associated therewith a function controller that monitors the line connected to all the controlling members and looks for a message having an identification portion that identifies the message as originating from its own associated controlling member. Once a signal is detected as originating from its associated controlling member, the function controller reads the message, including the instruction portion, and carries out the instructions by applying or terminating electric power as needed to turn on or off lights, power or stop electric motors, and so forth.

One difficulty with the circuit set forth in my patent application bearing Ser. No. 11/443,583 is that each of the controlling members must have a unique identification code that is identifiable by its associated function controller. During the manufacture of the vehicle, therefore, the identification code issued by each controlling member must be keyed to its associated function controller, and if the two are not properly keyed, the vehicle will not operate as intended.

SUMMARY OF THE INVENTION

Briefly, the present invention is a method for keying an identification code of a controlling member to a code reader of a function controller for controlling a function. In accordance with the invention, each controlling member has a card reader for reading a card bearing a code. The controlling member is configured to adopt the code on the card as the identification code to be attached as the identification portion of any message imparted into the signal line or other media for transmitting the message. In similar fashion, each of the function controllers includes a card reader for reading a card bearing a code and the function controller is configured to adopt the code read from the card as being the identification code sought by the function controller as identifying a message as originating from its associated controlling member.

The invention further includes a plurality of cards with each of the cards bearing a code that is different from the code of any other card. Each of the cards is used to program or key the identification code into one controlling member and its associated function controller, after which the card is discarded. One element of the invention is, therefore, that each card be provided with a unique code such that the code of the card cannot be confused with the code of another card. Accordingly, any function controller programmed to seek a message having an identification code received from a first card will respond only to a controlling member issuing a message bearing the same identification code which was also received from the first card. Once the first card has been used to program a controlling member and its associated function controller, the card is taken out of circulation or destroyed.

It should be appreciated that in the manufacture of a large number of automobiles or the like, the cards bearing codes may be suitably filed or organized such that the same code is reused to key corresponding controlling members and function controllers for successive vehicles, such that the identification code for a given function, for example the headlights, is the same for all the vehicles.

The method of keying the identification code includes the steps of providing a controlling member that includes a card reader for reading a card bearing an identification code, with the controlling member programmed to adopt the code from the card as the identification code for any message imparted into the medium by which messages are transmitted. It should be appreciated that messages may be transmitted through a signal line as stated, or through a power line, or may be by wireless transmission.

The method further includes providing a function controller having a card reader for reading a code on a card and adopting the code from the card as the identification code for which the function controller will search to identify a message originating from its associated controlling member. Finally, the method includes providing a plurality of cards with each of the cards having a unique code imprinted thereon readable by the card readers of all controlling members and function controllers of a circuit. One of the cards is used to program each pair consisting of a controlling member and its associated function controller.

BRIEF DESCRIPTION OF THE DRAWINGS

A better understanding of the present invention will be had after a reading of the following detailed description taken in conjunction with the drawings wherein.

DETAILED DESCRIPTION OF A PREFERRED EMBODIMENT

Figure 1:
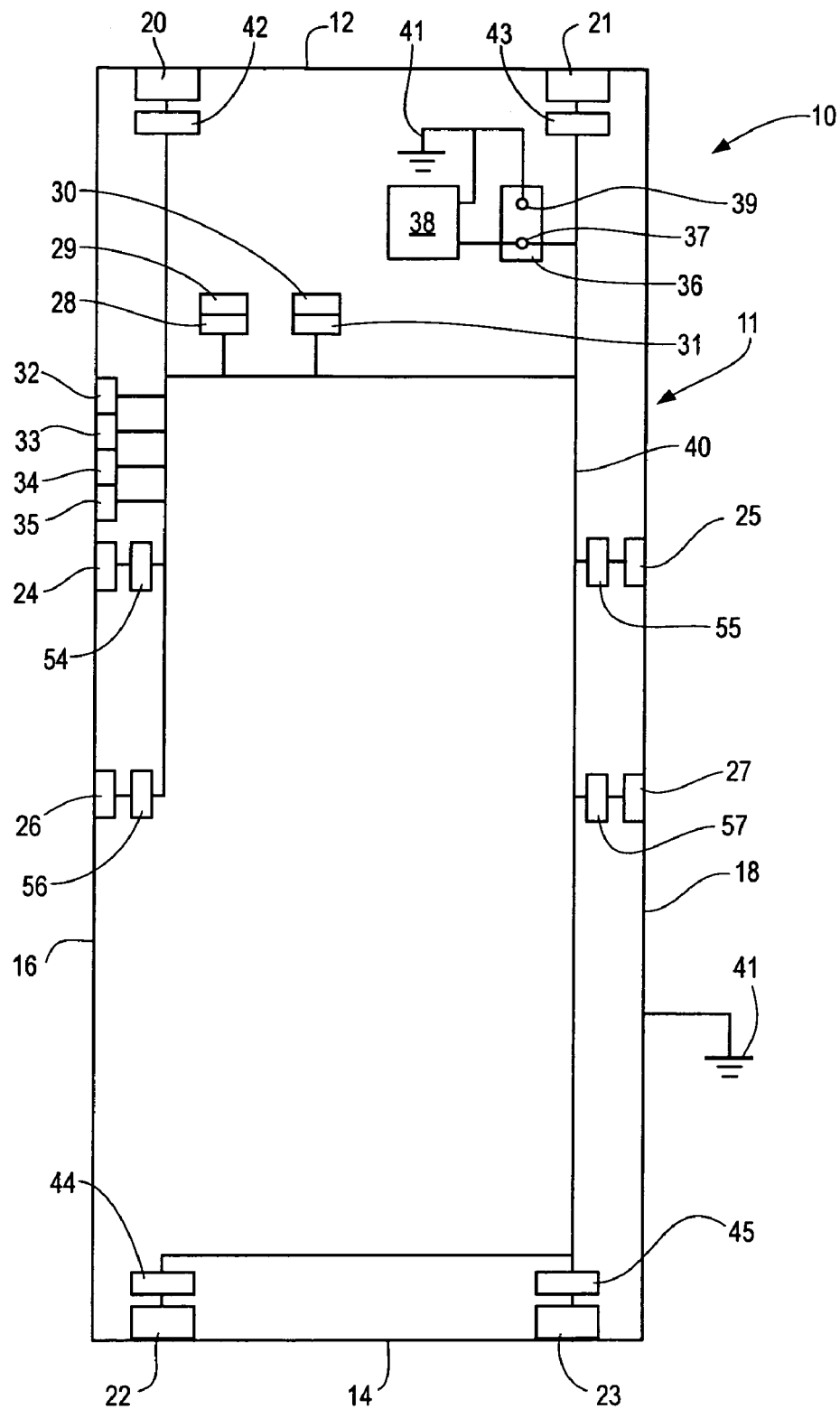
FIG. 1 is a schematic drawing of a circuit of a vehicle in accordance with the present invention.

Referring to FIG. 1, a vehicle 10 in accordance with the present invention has a generally electrically conductive metal frame 11 having a forward end 12, a rearward end 14, a left side 16, and a right side 18. Positioned on opposite sides of the forward end 12 are a pair of headlights 20, 21, and positioned on opposite sides of the rearward end 14 are a pair of brake lights 22, 23. Positioned on both sides of the mid-portion of the frame 11 are electrically operated windows 24, 25, 26, 27. Positioned so as to be reachable by the driver is a controlling member 28 for operating the headlights 20, 21, and a brake pedal 30 for operating the vehicle brakes, not shown. Movement of the brake pedal 30 also activates a brake light controlling member 31 for operating the brake lights 22, 23. The vehicle also includes independent window controlling members 32, 33, 34, 35 for operating the electric windows 24-27. There are many other functions in the vehicle other than those depicted, and all of such functions are powered and controlled by the same method described herein with respect to the headlights, brake, and windows.

In accordance with the invention, the vehicle has an electrical system including a battery 36 having a power terminal 37 and a ground terminal 39, and a generator 38 configured to maintain a charge on the battery 36. A power line 40 has one end connected to the power terminal 37 of the battery 36 and the power line 40 connects to one terminal of each of the various functions of the vehicle including the headlights 20, 21, the brake lights 22, 23, and the power operated windows 24-27. In similar fashion, the power line 40 is also connected to the headlight controlling member 28, the brake light controlling member 31, and the window controlling members 32-35. The ground terminal 39 of the battery 36 and the second terminal of all the various functions 20-27 and their associated controlling members are connected to the body 11 of the vehicle as a ground 41. To simplify the drawings, the ground terminals of the various functions and the various function controllers are collectively depicted in the single ground 41 attached to the body 11 of the vehicle 10.

In accordance with the prior art, the headlights of a vehicle are controlled by a switch positioned along a dedicated power line extending from the power terminal of the battery to the headlight. The dedicated line extends first to the dashboard of the vehicle where the switch is located and then to the two headlights.

Figure 2:
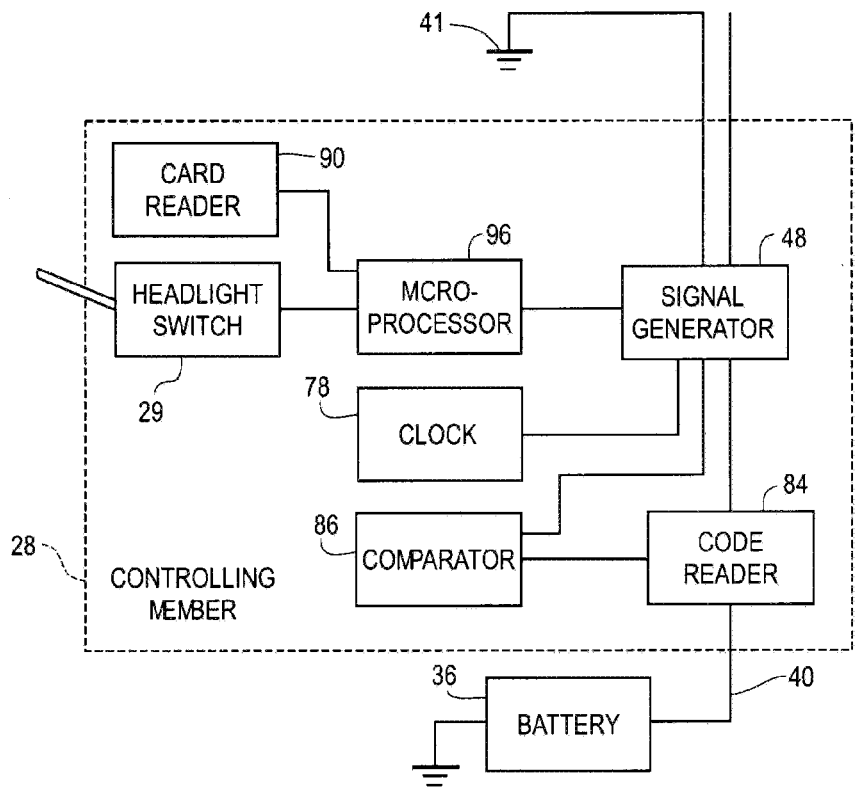
FIG. 2 is a block diagram of one controlling member that is representative of all controlling members used in the circuit shown in FIG. 1.
Figure 3:
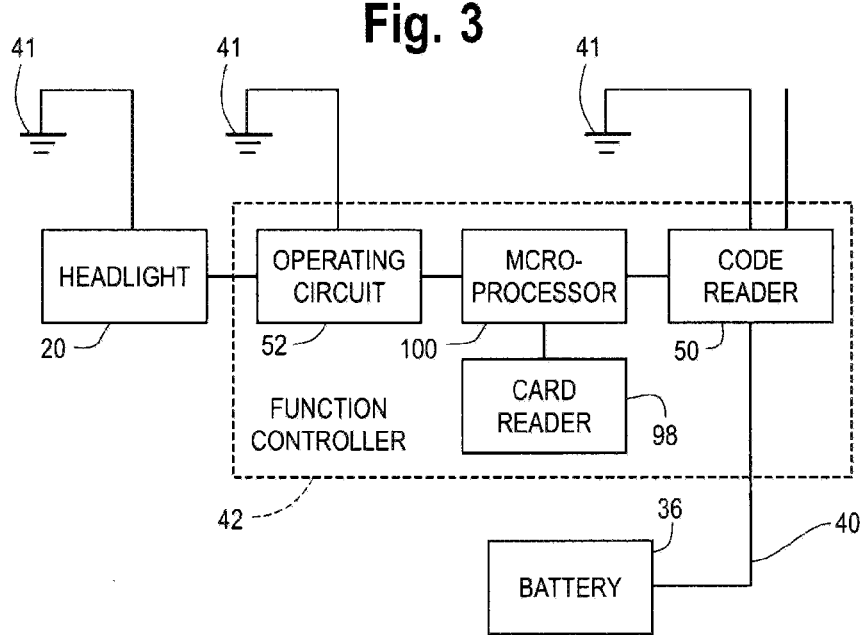
FIG. 3 is a block diagram of one function controller that is representative of all function controllers used in the circuit shown in FIG. 1.

Referring to FIGS. 1, 2 and 3, in the present invention, the controlling member 28 that controls the headlights 20, 21 is not connected to the headlights 20, 21 by a dedicated wire, but is instead connected only to the power line 40 and to ground 41. As shown in FIG. 2, the headlight controlling member 28 includes a moveable device 29 moveable from a first position indicative of an "on" condition in which the headlights 20, 21 are to be illuminated and a second position indicative of an "off" condition in which the headlights 20, 21 are not to be illuminated. The moveable device 29 has the exterior appearance of a typical light switch and it operates a selection device 31 such as a double pole switch that connects a signal generator 48 to the power line 40 in either a first orientation or a second orientation. The signal generator 48 generates a coded message that is sent down the power line 40 with the message carrying a first instruction when the signal generator 48 is in the first orientation indicating that the lights are to be "on" and the message carrying a second instruction when the signal generator 48 is in the second orientation indicating that the lights are to be "off." The message generated by the signal generator 48 includes an identification code that is distinguishable from the message generated by any other signal generator in the vehicle 10.

In another portion of the vehicle are the headlights 20, 21. Referring to FIG. 3, headlight 20 is connected through its function controller 42 to the power line 40. The function controller 42 includes a code reader 50 that monitors the power line 40 and responds only to a message bearing the identification code indicating that the message originated from the signal generator 48. When the code reader 50 detects a message in the power line 40 identifiable as originating from signal generator 48 and indicating that the moveable device 29 has been moved to an "on" position, it transmits that information to an associated operating circuit 52 which in turn carries out the operators instruction by applying electric power to the headlight 20 causing it to be illuminated. Conversely, when the code reader 50 detects a message in the power line 40 originating from signal generator 48 indicating that the moveable devise 29 has been moved to the "off" position, it transmits that information to the operating circuit 52 which terminates power to the headlight 20 causing it to turn off.

A second function controller 43 identical to the first function controller 42 is connected between the power line 40 and the second headlight 21, causing the second headlight 21 to operate exactly like the first headlight 20. As a result of the use of the controlling member 28 and the function controllers 42, 43, it is not necessary to transmit information from a switch on the vehicle dashboard to the headlights 20, 21 by means of a separate dedicated wire. In similar fashion, all the systems of the vehicle 10 and the various controlling members can be connected to the same power line 40.

In like manner, each of the brake lights 22, 23 is connected to the same power line 40 through an associated function controller 44, 45 respectively. The function controllers 44, 45 for the brake lights 22, 23 respond to a message in the power line 40 generated by the brake light controlling member 31. The message generated by controlling member 31 is differentiated from a message from the headlight controlling member 28 by a unique identification code that enable the function controllers 44, 45 to identify a message as originating from the brake light controlling member 31.

Each of the electrically operated windows 24, 25, 26, 27 has an associated function controller 54, 55, 56, 57 respectively, all of which are also connected to the power line 40. Each window function controller 54-57 monitors the power line 40 for a message and applies power to each of the electric motors, not shown, that operate the windows in response to the instruction portion of a message applied to the power line 40 that bears an identification code identifying the message as originating only from its associated controlling member 32-35.

Figure 5:
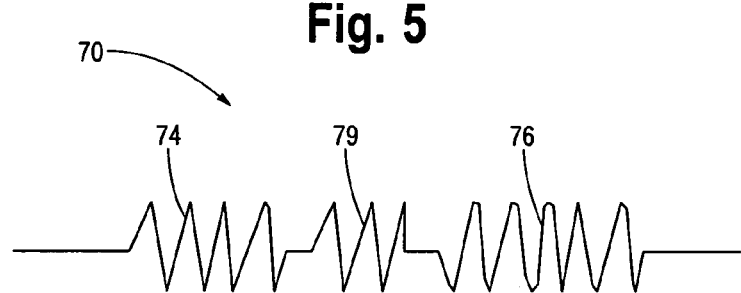
FIG. 5 is a schematic diagram of a typical message applied by a controlling member to a signal line.

Referring to FIGS. 1 and 5, the message 70 is sent in a code that is either a train of binary numbers or a frequency varied sequence. In either case, the message 70 includes an identification portion 74 in which the source of the message is uniquely identified and an information portion 76, which conveys the status of the input, in the case of the headlights 20, 21, whether the device 29 is calling for the lights 20, 21 to be "on" or "off." Between the identification portion 74 and the information portion 76 is a warning signal that tells the function controllers 42, 43 that are reading the signal that the identification portion 74 of the message 70 is over and that the information portion 76 will follow.

Figure 6:
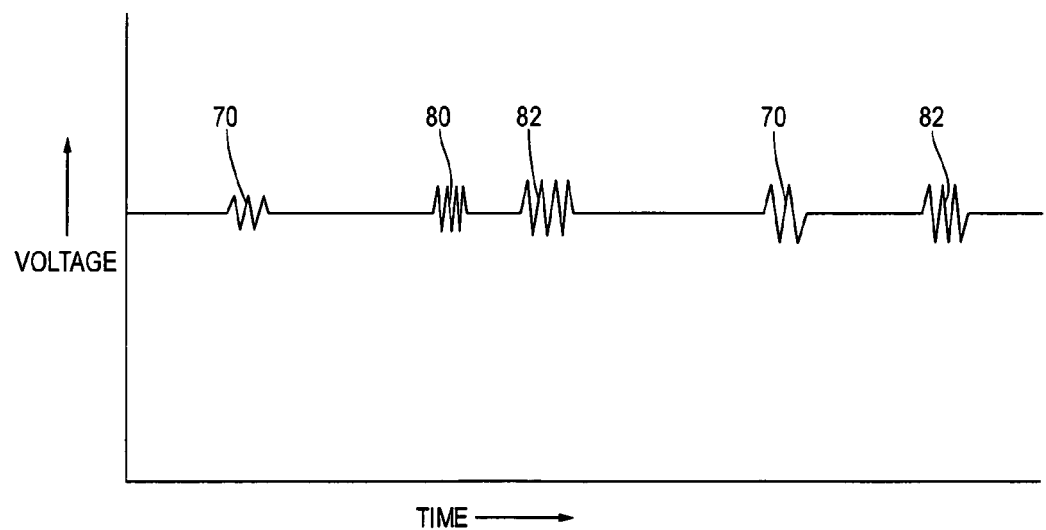
FIG. 6 is a graph of the voltage against time in the power line of a vehicle where messages are being applied to the power line of the vehicle shown in FIG. 1.

Referring to FIGS. 2 and 6, each of the controlling members 28, 31, 32, 33, 34, 35, of which controlling member 28 is representative of all, includes a clock 78 that enables the controlling member to apply its message to the power line 40 as an asynchronized signal where the length of one message 70 is relatively short, so as to be conveyed in a period of perhaps one one-thousandth of a second, and the message 70 is not repeated until a significantly longer period of time, perhaps three hundred-thousandths of a second have elapsed. Since the messages 70 from the various controlling members 28, 31, 32, 33, 34, 35 are asynchronized by the clocks 78 of the various controlling members, each message from the controlling members is sent according to a different time table. A message 70 from controlling member 79 will rarely interfere with a message 80 from controlling member 31 or message 82 from controlling member 32, and so on. Where two or more messages do overlap, the resulting signal will be incomprehensible to all function controllers in the vehicle 10 and will be ignored by all.

Referring further to FIG. 2, each controlling member 28 also includes a coded reader 84 and a comparetor circuit 86 that enables the controlling member 28 to read the signal that it has applied to the power line 40 and compare it to the signal that was sent. If the controlling member 28 cannot detect a signal on the line that conveys the necessary information to instruct its associated function controller 42, the message will not be conveyed and the device will fail to operate properly. To avoid such a failure, the controlling member 28 monitors the line 40 to detect its own message in understandable form. If an understandable message is not detected, the message is repeated at the next transmission window as determined by its associated clock 78. The message is repeated each time the window opens as determined by the clock 78, until the comparator circuit 86 detects at least one comprehendible transmission of the message. It may be desirable for the controlling member 28 to continue transmitting the message until the comparator 86 determines that the message has been properly transmitted twice, or some other number of times to insure proper reception by the associated function controller 42.

It should be appreciated that microelectronic parts including function controllers are not expensive to manufacture. As a result, it is far less expensive to manufacture a control system with each controlling member operating on its own clock 78 than to provide a master clock for the vehicle 10 and synchronize all the controlling members off the single clock. Although the interval between transmission windows for each controlling member is long compared to the length of the message 70 transmitted, the delay is in the magnitude of fractions of a second. Also, the individual clocks 78 can be set to transmit messages from critical vehicle functions, such as brake lights, more frequently than noncritical functions, such as electric windows.

The forgoing circuit has been set forth in further detail in my co-pending application bearing Ser. No. 11/443,583 which is incorporated herein by reference. As explained in my co-pending patent application, the messages issued from the controlling member and received by the function controllers may be imparted into the power line, or into a signal line that is separate from the power line, or into any other suitable medium including wireless transmission. To avoid interference from outside sources, it is preferable that the signal be imparted to either the power line or to a signal line independent of the power line and any other wiring of the vehicle with the signal line connecting all of the controlling members and function controllers of the vehicle.

Figure 4:
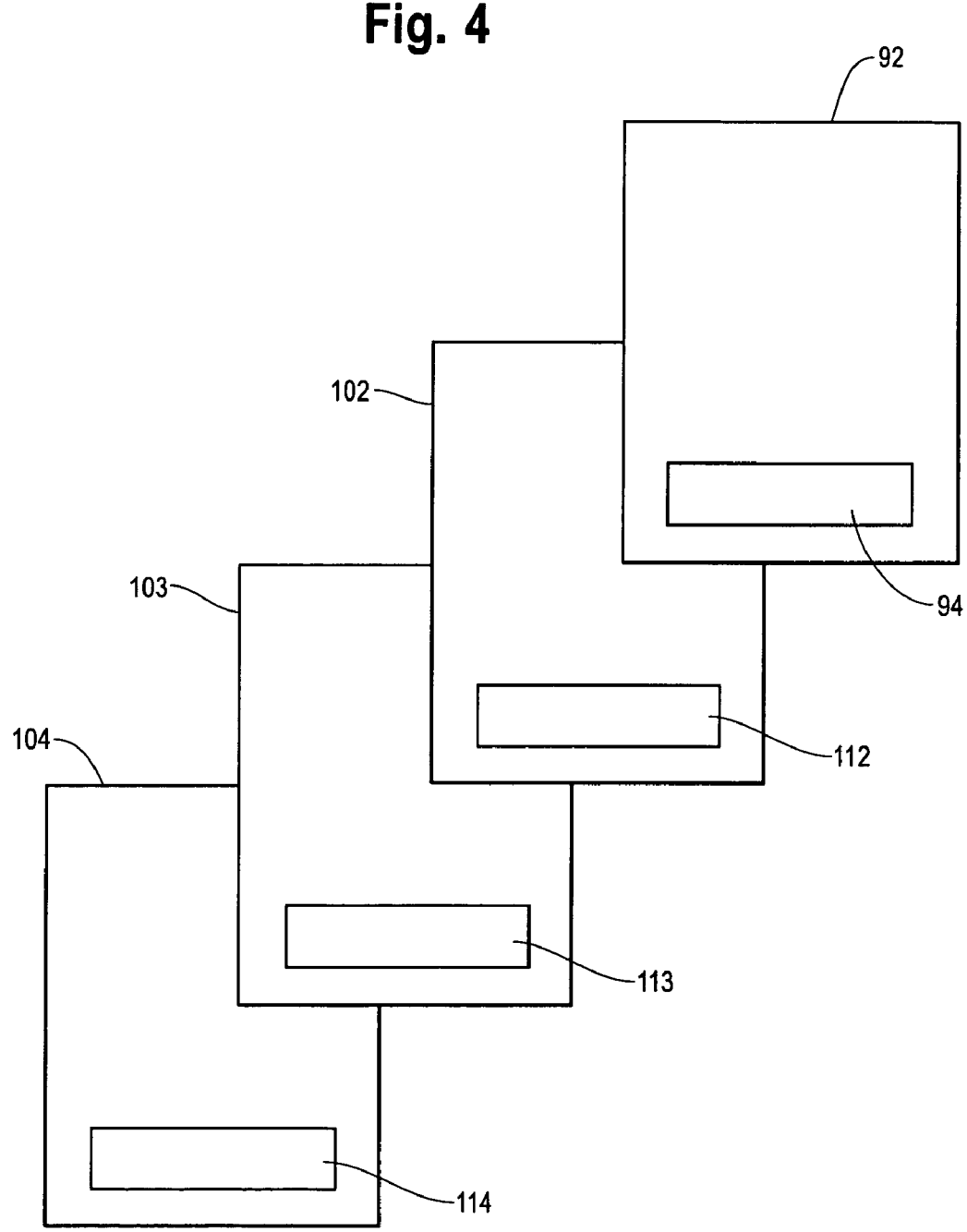
FIG. 4 is a diagram of a plurality of cards readable by the card readers of the controlling members and the function controllers depicted in FIGS. 2 and 3.

Referring to FIGS. 2 and 4, in accordance with the present invention, each controlling member 28 also includes a card reader 90 suitable for reading a card 92 having imbedded therein a code 94. In the preferred embodiment, the controlling member 28 includes a microprocessor 96 that is configured to receive the code 94 as read by the code reader 90 from the card 92 and adopt the code 94 as the identification code to be attached to any message applied to the power line 40 or to any other media for transmitting a message.

Referring to FIGS. 3 and 4, each function controller, of which function controller 42 is representative of all, also includes a card reader 98 for reading a card 92 and a microprocessor 100 configured to adopt the code 94 as read from a card 92 by the card reader 98 as the identification code of its associated controlling member such that the function controller 42 will respond to its associated controlling member 28.

Referring to FIGS. 1 through 4, the present invention therefore includes a plurality of cards, 92, 102, 103, 104 . . . , with each of the cards having imbedded therein a unique code 94, 112, 113, 114 . . . . The programming and pairing of a controlling member 28 and its associated function controller 42 such that the controlling member 28 will issue a message with a code that is identifiable only by function controller 42, requiring that one of the plurality of unique cards 92, 102, 103, 104 is inserted into the card readers 90, 98 of the paired controlling member 28 and function controller 42. As a result of inserting the card 92 into the card reader 90 of the controlling member 28, the controlling member 28 will issue a message bearing code 94 as its identification code, and as a result of the function controller 42 having received the identification code 94 from the card 92, the function controller 42 will look for and read a message bearing the code 94 as its identification code. Accordingly, the controlling member 28 and function controller 42 will be paired with each other. In similar fashion, a different card 102, 103, 104 bearing a different code 112, 113, 114 is inserted in the respective card readers 90, 98 of the various controlling members 28, 31, 32, 33, 34, 35 and for each of the various controlling members, the unique card is inserted into its associated function controller 42, 43, 44, 45, 54, 55. Since each card 92, 102, 103, 104 is used to program only one controlling member and its paired function controller, each controlling member will send a signal receivable only by its associated function controller and the signals from the various controlling members will not be confused with one another by the various function controllers of the vehicle.

It should be appreciated that the various cards 92, 102, 103, 104 . . . may be discarded after a single use so as not to result in a conflict between two unrelated pairs of controlling members and function controllers, or the cards 92, 102, 103, 104 may be retained and reused for programming the corresponding controlling members and function controllers in a different vehicle. Using this method, a set of cards 92, 102, 103, 104 can be used by a manufacturer to program the various controlling members and function controllers of the vehicles manufactured by a single plant. The identification codes of a first vehicle manufactured by the plant will then correspond to the identification codes of a second vehicle manufactured by the same plant.

It should be appreciated that although the invention has been described with respect to a single embodiment, there are many modifications and variations which fall within the spirit and scope of the invention. It is therefore the intent of the appended claims to cover all such modifications and variations that fall within the true spirit and scope of the invention.

What is claimed:

1. A system for controlling the functions of a vehicle wherein said vehicle includes a plurality of functions, the operation of each of which is controlled by a function controller wherein each said function controller responds to an associated one of a plurality of controlling members wherein each of said associated controlling members issues a message having an identification portion and an instruction portion and wherein each said function controller responds only to a message having an identification portion identifying its associated controlling member as the source of the message, an improvement comprising one of said controlling members having a code reader for reading a code wherein said one of said controlling members will adopt said code as its identification code for said identification portion of its message, one of said function controllers having a code reader for reading a code wherein said one of said function controllers will adopt said code as the identification code identifying a message as having been sent by its associated controlling member, and a library of unique codes readable by—a—code reader of said one of said controlling member and readable by said code reader of said one of said function controller wherein on insertion of one of said unique codes in said code reader of said one of said function controllers and into said code reader of said one of said controlling members said one of said controlling members will issue said one of said unique codes as its identification portion of its messages and said one of said function controllers will recognize said one of said unique codes as part of a message from its said controlling member.

2. A system for controlling the functions of a vehicle wherein said vehicle comprises a source of DC power, a plurality of functions on said vehicle, a plurality of function controllers on said vehicle, one of said function controllers for each of said plurality of functions, a plurality of controlling members on said vehicle, a controlling member for each function controller of said plurality of functions wherein each of said function controllers responds only to a message having an identification portion identifying its associated controlling member as the source of said message, a first of said controlling members having a code reader for reading a code wherein said first of said controlling members will adopt said code read by its said code reader as its identification code for said identification portion of its message, a first of said function controllers having a code reader for reading a code wherein said first of said function controllers will adopt said code read by its said code reader as the identification code identifying a message as having been sent by its associated controlling member, a second of said controlling members having a code reader for reading a code wherein said second of said controlling members will adopt said code read by its said code reader as its identification code for said identification portion of its message, a second of said function controllers having a code reader for reading a code wherein said second of said function controllers will adopt said code read by its said code reader as the identification code identifying a message as having been sent by its associated controlling member, a library of codes wherein each of said codes in said library is unique and different from any other of said codes in said library and each of said codes is readable by said code reader of said first and second controlling members and said first and second function controllers and wherein a first code from said library is insertable into said code readers of said first of said controlling members and said first of said function controller and said first of said controlling members will issue a message with said first code as its identification code and said first of said function controllers will search a transmission medium for a message having said first code as its identification code, and a second of said codes from said library is insertable into said code readers of said second of said controlling members and said second of said function controllers and said second of said controlling members will issue a message with said second code as its identification code and said second of said function controllers will search said transmission medium for a message having said second code as its identification code.

3. The method of keying an identification code to each of a plurality of controlling members and to code readers of plurality of function controllers for controlling a plurality of functions wherein each of said controlling members generates a message consisting of said identification code portion for identifying said controlling member as a source of said message and an instruction portion for directing the operation of an associated function, said message conveyed through a medium and wherein each of said plurality of function controllers monitors said medium and upon detecting a message having an identification code originating from its associated controlling member, each of said function controllers will read said message and control its associated function in accordance with said instruction portion, said method comprising the steps of providing said plurality of controlling members, providing an identifier code reader for each of said controlling members wherein each of said code readers will read an identification code and will transmit said identification code read by its identifier code reader as said identification code portion of any said message imparted to said medium, providing a plurality of said function controllers, providing an identifier code reader for each of said plurality of function controllers wherein each of said identifier code readers will read an identification code and its associated function controller will search said medium for a message having said identification code as said identification code portion of a message, providing a code library having a plurality of unique codes, inserting a first code from said library into said identifier code reader of a first of said controlling member and into said identifier code reader of a first of said function controllers wherein said first of said controlling members will issue a message with said first code as its identification code and said first of said function controllers will search a transmission medium for a message having said first code as its identification code, and inserting a second code from said library into said identifier code reader of a second of said controlling member and into said identifier code reader of a second of said function controller wherein said second of said controlling member will issue a message with said second code as its identification code and said second of said function controller will search said transmission medium for a message having said second code as its identification code.

4. The method of keying identification codes to a plurality of controlling members to the code readers of a corresponding plurality of function controllers wherein each of said controlling members generates a message consisting of said identification code portion for identifying said one of said controlling members as the source of said message, and an instruction portion for directing the operation of its associated function, said message conveyed through a medium and wherein each of said function controllers monitors said medium and upon one of said function controllers detecting a message having an identification code originating from its associated controlling member said one of said function controller reads said message and controls said function in accordance with said instruction portion, said method comprising the steps of providing said plurality of controlling members, providing a code reader for each of said plurality of controlling members wherein said code reader will read an identification code and will transmit said identification code read by its associated code reader as its identification code portion of any said message imparted to said medium by said controlling member, providing a plurality of said function controllers, providing an identification code reader for each of said plurality of said function controllers wherein said identification code reader will read an identification code and its associated function controller will search said medium for a message having said identification code as said identification code portion of a message, providing a library of unique codes, inserting a first of said unique codes into said code reader of a first of said controlling members, inserting said first of said unique codes into said identification code reader of a first of said function controllers, inserting a second of said unique codes into said code reader of a second of said controlling members, inserting said second of said unique codes into said identification code reader of a second of said function controllers wherein said first function controller is paired with said first controlling member and said second function controller is paired with said second controlling member.

5. The system of claim 2 and further comprising a common signal line connecting all of said function controllers of said plurality of functions and all said associated controlling members wherein said controlling members issue said messages through said common signal lines and said function controllers monitor said signal line for a message from its associate controlling member.

6. The method of claim 3 and comprising the further step of connecting a signal line to all of said function controllers and all of said controlling members wherein said medium is said signal line and said messages from said controlling members are directed down said signal line and said function controllers search said signal line for a message from its associated controlling member.

* * * * *